July 8, 1952
C. JOHNSON
2,602,363
MACHINE TOOL CONTROL
Filed July 29, 1948
2 SHEETS—SHEET 1
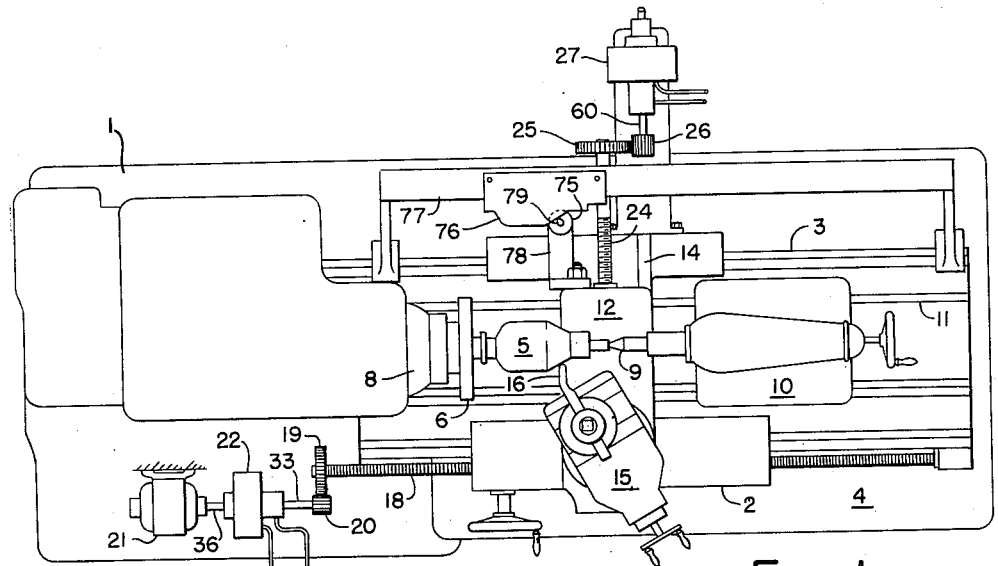
FIG. 1
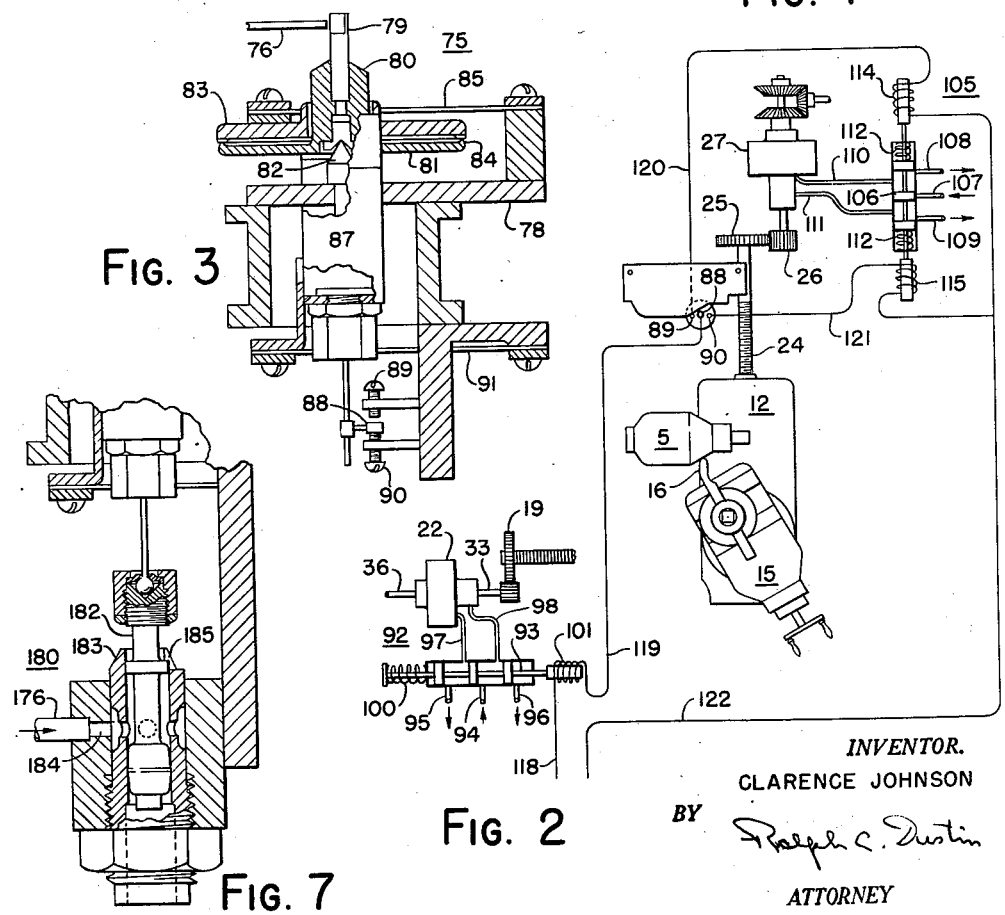
INVENTOR.
CLARENCE JOHNSON
BY
Ralph C. Dustin
ATTORNEY INVENTOR.
CLARENCE JOHNSON
BY Ralph C. Dustin
ATTORNEY Patented July 8, 1952

2,602,363

UNITED STATES PATENT OFFICE 2,602,363

MACHINE TOOL CONTROL

Clarence Johnson, Orfordville, Wis., assignor, by mesne assignments, to Rockwell Manufacturing Company, Pittsburgh, Pa., a corporation of Pennsylvania Application July 29, 1948, Serial No. 41,279

8 Claims. (Cl. 82—14)

This invention relates to contour control mechanisms, and more particularly to mechanisms for positioning a cutting tool relative to a work piece so as to shape the latter in accordance with the profile of a templet or guide member.

As understood by those familiar with the art, a work piece may be formed in a machine lathe by moving a cutting tool longitudinally and transversely of the lathe while the work piece is rotated about its axis. In other machines, such as some types of milling machines, the work piece may be moved in different directions while the tool, except for rotation about its axis, remains stationary. In other types of milling machines, and usually in die making machines, the tool may be moved in one or more directions while the work piece is also moved in one or more directions. In all instances, however, it is the relative movement between the tool and the work piece that causes the latter to be formed to the desired shape. For moving the tool or work piece there may be provided feed screws and clutch mechanisms for connecting them selectively in driven relation with power shafts.

In a preferred form of my invention a tracer cooperates with a templet and controls valve mechanisms for supplying liquid to hydraulic clutches in a manner to effect either a longitudinal or transverse movement of a cutting tool. The tracer normally assumes a position to effect operation of a clutch mechanism for positioning the cutting tool transversely of the work piece. The tracer moves with the tool, and the direction of movement is such as to engage the tracer with the templet for changing its position until the valve mechanisms operate to disconnect the transverse feed clutch and apply the clutch for effecting longitudinal feed. If the shape of the templet is such that the tracer is actuated further by reason of the longitudinal feed, then the valve mechanisms are operated to disconnect the longitudinal feed clutch and apply the transverse feed clutch so as to move the tool and the tracer away from the templet.

An object of my invention is to provide an improved mechanism for positioning a cutting tool and a work piece relative to each other so as to shape the work piece to correspond to the pattern of a templet. Another object is to provide improved means for positioning the cutting tool of a machine lathe transversely and longitudinally of the lathe bed so as to shape a work piece to the pattern of a templet. Yet another object is to provide means for moving a cutting tool automatically in steps at right angles so as to shape a work piece to the shape of a templet. Still another object is to provide a tracer cooperating with a templet for controlling the operation of clutch mechanisms to effect either a transverse or a longitudinal movement of a cutting tool relative to a work piece. Other objects will appear in the course of the following description.

In the accompanying drawings there are shown for purposes of illustration, two forms which my invention may assume in practice.

In these drawings:

Fig. 1 is a plan view of a machine lathe in which my invention is incorporated.

Fig. 2 is a schematic diagram of the control system for the lathe of Fig. 1.

Fig. 3 is an enlarged sectional view of a tracer employed in the control system of Fig. 2.

Fig. 7 is a fragmentary section view of a tracer adapted for use in the control system of Fig. 6.

Figure 6:
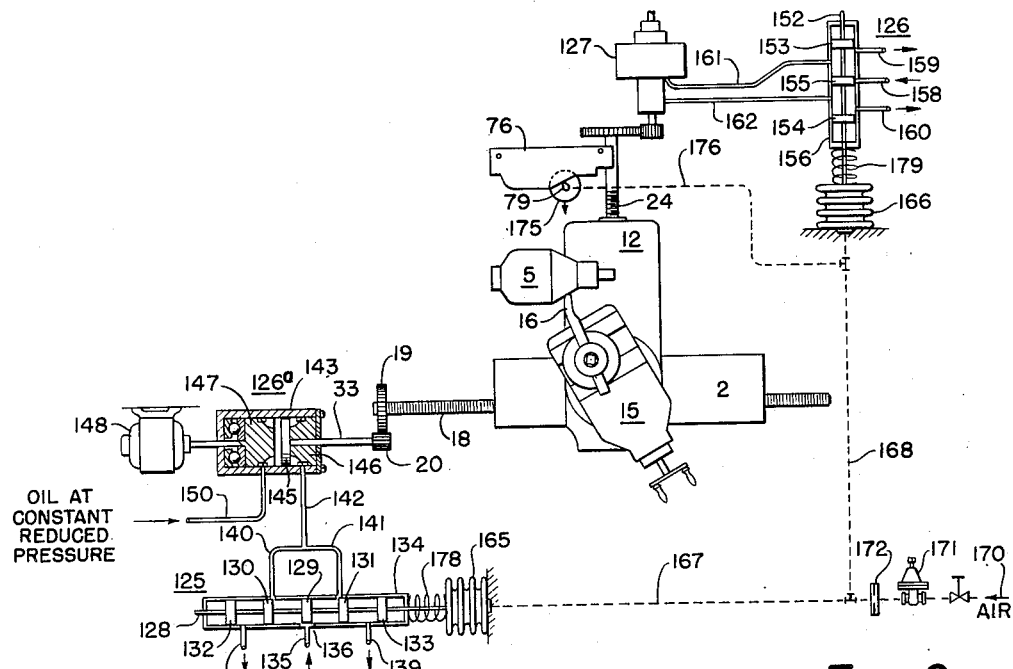
Fig. 6 is a schematic diagram of a pneumatic control system for positioning the tool of the machine lathe.

Referring to the drawings, and more particularly to Fig. 1, it will be noted that there is shown a machine lathe 1 having a carriage 2 slidably mounted in guideways 3 extending longitudinally of the lathe bed 4. A work piece 5 is fixed at one end to a head stock 6 driven by a motor 8, and is rotatably supported at its other end by a tail stock 9 mounted on a carriage 10 which is slidably supported on suitable ways 11 for movement longitudinally of the lathe. A cross-slide 12 is mounted in ways 14 on the carriage 2 for sliding movement transversely of the lathe. A tool support 15 is adjustably mounted on the cross-slide and carries a tool 16 for performing work on the workpiece. A feed screw 18 operatively engages the carriage 2 and carries a gear 19 meshing with a pinion gear 20 driven by a motor 21 through a clutch mechanism 22 which will be described shortly more in detail. Movement of the cross-slide transversely of the lathe is effected by a feed screw 24 operatively engaging the cross-slide and carrying a gear 25 meshing with a pinion gear 26 which may be driven in one direction or the other by suitable power means operating through a clutch mechanism 27.

Figure 4:
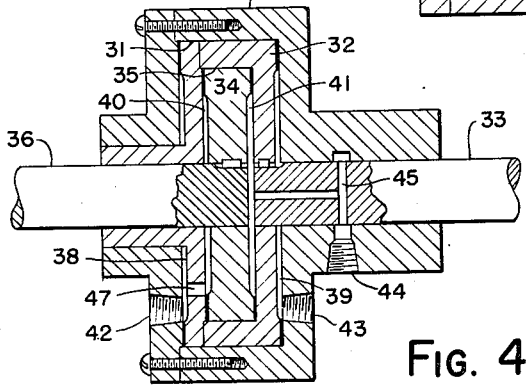
Fig. 4 is an enlarged vertical sectional view of the clutch mechanism for controlling longitudinal feed of the tool in Fig. 1.

The clutch mechanism 22 comprises, as shown in Fig. 4, a housing 30 having a bore 31 in which a driven element 32 in the form of a casing is rotatably received. The housing is secured to the base of the lathe by any suitable means, not shown, and the driven element is slidably keyed to a shaft 33 carrying the pinion gear 20. A driving element 34 is rotatably received within a bore 35 in the driven element and is slidably keyed to the power shaft 36 of the motor 21. The driven element 32 is so proportioned that clearances of only a few thousandths of an inch are provided between its opposite ends and the end walls of the housing when centered therein, and the driving element is shaped to provide clearances of only a few thousandths of an inch between its opposite ends and opposed surfaces on the driven element. The end surfaces of the driven element are recessed to provide spaces 38 and 39 between it and the housing, and the driving element has its end surfaces recessed to provide spaces 40 and 41 between it and the driven element. Ports 42 and 43 open through the housing into the spaces 38 and 39, respectively, and a port 44 opens through the housing into communication with passage means 45 extending through the shaft 33 to the space 41.

The ports 43 and 44 are adapted to be connected by means shortly to be described, selectively in communication with a liquid supply and with exhaust. When liquid is supplied through the port 43 to the space 39, the driven element is forced into engagement with the housing at the left hand end of the bore 31 for braking the rotation of the shaft 33. A supply of liquid through the port 44 and the passage means 45 to the space 41 results in a moving of the driving and driven elements into engagement with each other at the left hand end of the bore 35 and a connection of the power shaft 36 in driving relation with the shaft 33. The driven and the driving elements have close rotating fits in the bores 31 and 35, respectively, but sufficient liquid passes between them and the walls of the bores to provide the necessary lubrication. Liquid escaping through the bores enters the spaces 38, 40 and is drained from the housing through the port 42 so that it does not interfere with the movement of the elements into frictional engagement with each other and with the housing. A port 47 in the driven element permits liquid to drain from the space 40 to the space 38 where it escapes through the drain port 42.

Figure 5:
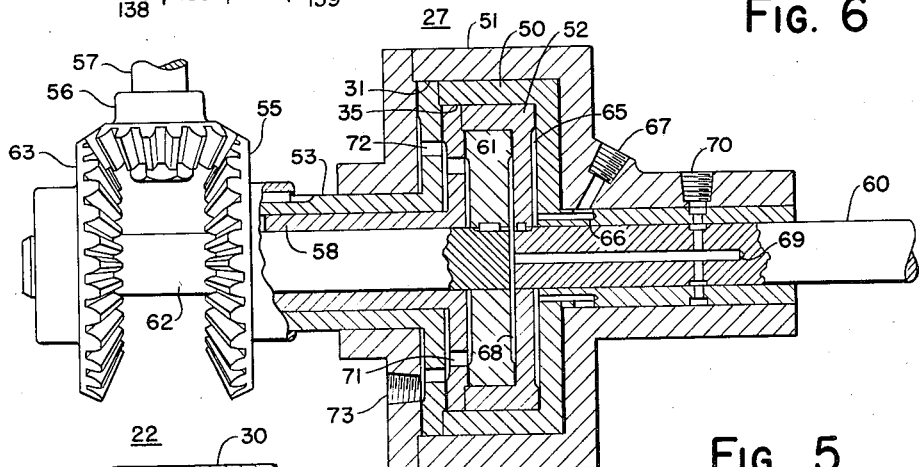
Fig. 5 is an enlarged sectional view of the clutch mechanism for controlling transverse feed of the tool in Fig. 1.

The clutch mechanism 27, as shown in Fig. 5, is like the clutch mechanism 22 except that a driving element 50 is rotatably received within the space between the housing 51 and the driven element 52. The driving element 50 is provided with a tubular shaft 53 extending through an opening in the housing and carrying a beveled gear 55 attached to a power shaft 57. The driven element 52 has a reduced sleeve portion 58 at one end extending through the tubular shaft 53 and is slidably keyed at its other end to a shaft 60 carrying the pinion gear 26, as shown in Fig. 1. A driving element 61 is slidably keyed to a shaft 62 extending through the sleeve portion 58 and carrying a beveled gear 63 meshing with the driving gear 56. The driving elements and the driven element are so proportioned that they have close rotating fits at their peripheries and provide clearances of only a few thousandths of an inch between their end surfaces. The driven element is recessed at its right hand end to provide a space 65 which may be connected to a liquid supply or to exhaust through passage means 66 and a port 67 in the housing. The driving element 61 is recessed at its right hand end to provide a space 68, and liquid may be supplied to or discharged from the space through a passage 69 in the shaft 60, and a port 70 in the housing. The left hand ends of the driving and driven elements are recessed to provide spaces for receiving liquid escaping between the peripheries of the elements, and ports 71 and 72 drain the liquid from these spaces to a port 73 in the casing.

It will be appreciated that the driving elements 50 and 61 are rotated in opposite directions by reason of their connections through the gears 55 and 63 to the driving gear 56. When liquid is supplied under pressure to the space 65, the driving element 50 and the driven element 52 are forced in opposite directions until they engage each other at their left hand ends and are held for rotation together. A supply of liquid to the space 68 effects engagement between the driven element and the driving element 61 at their left hand ends for rotating the shaft 60 in the opposite direction.

For controlling the supply and discharge of liquid relative to the clutch mechanisms 22 and 27, there is provided, as shown in Fig. 1, a tracer 75 cooperating with a templet 76 and connected in a control system, as shown in Fig. 2. The templet is mounted on a stationary member 77 fixed to the base of the lathe and is provided with a guide surface conforming to the desired shape of the workpiece. The tracer is supported by a bracket 78 attached to the cross slide 12 and includes a tracer arm 79 engageable with the guide surface on the templet. The tracer arm, as shown in Fig. 3, is supported by a hub portion 80 on a circular plate 81 which rests upon a pivot point 82 carried by the bracket 78. An annular plate 83 surrounds the hub portion and rests upon the knife edge of a flange 84 formed on the plate 81 at its periphery. A spring arm 85 is fixed to the bracket 78 and acts upon the plate 83 for holding the latter normally in engagement with the flange 84. A yoke 87 is carried by the plate 83 and has a contactor 88 attached thereto for engagement with contacts 89 and 90 adjustably supported by the bracket 78. A leaf spring 91 is connected between the bracket and the yoke so that parallel motion of the latter is obtained when the plate 83 is raised or lowered.

When the plate 83 engages the flange 84 over its full circumference, as shown in Fig. 3, the contactor 88 engages the lower contact 90. As the tracer arm 79 is moved against the templet to cause a tilting of the plate 81 about the pivot point 82, the plate 83 is raised and, by reason of the arms 85 and 91, is always held in horizontal positions. The yoke 87 is moved upwardly in a vertical position as the plate 83 is raised, and the contactor 88 is moved out of engagement with the contact 90. If the tracer arm is tilted sufficiently, the contactor 88 will be moved into engagement with the contact 89.

As shown in Fig. 2, a valve mechanism 92 is provided with a valve member 93 for controlling the connection of a liquid supply conduit 94 and exhaust conduits 95 and 96 in communication with conduits 97 and 98 leading to the ports 43 and 44, respectively, in the housing of the clutch 22. A spring 100 acts on the valve member for holding the latter normally in a position to supply liquid from the conduit 94 through the conduit 98 to the port 44. A solenoid 101 has its plunger connected to the valve member 93 and is operative when energized to move the latter against the action of the spring 100 to a position for connecting the supply conduit 94 to the conduit 97, and connecting the conduit 98 to the exhaust conduit 96.

The supply of liquid to the clutch mechanism 27 is controlled by a valve mechanism, generally designated 105. This valve mechanism includes a valve member 106 for controlling the connection of a liquid supply conduit 107 and exhaust conduits 108 and 109 with conduits 110 and 111 communicating with the ports 67 and 70 in the housing of the clutch 27. Springs 112 normally hold the valve member in a position to cut off communication between the conduits 110, 111 and the supply conduit 107 and to connect them to the exhaust conduits 108 and 109. Solenoids 114 and 115 have plungers connected to the valve member and are operative when energized to move the latter against the action of the springs 112.

A conductor 118 of a power line is connected to one end of the solenoid 101, and the other end of the solenoid is connected by a conductor 119 to the contactor 88. The contacts 89 and 90 are connected, respectively, through conductors 120, 121 and the solenoids 114 and 115 to the other conductor 122 of the power line.

When the tracer arm 79 is free of the templet, the plates 81 and 83 engage each other as shown in Fig. 3 and the contactor 88 engages the contact 90. A circuit is then completed from the power conductor 118 through the solenoid 101, the conductor 119, the contactor 88, the contact 90, the conductor 121 and the solenoid 115 to the power conductor 122. Energizing of the solenoid 101 effects movement of the valve member 93 to a position for supplying liquid from the conduit 94 through the conduit 97 to the space 39 between the clutch housing 30 and the driven element 32. The space 41 is connected at the same time through the passage means 45 and the conduit 98 to the exhaust conduit 96. The liquid in the space 39 acts to move the driven element into engagement with the housing at its left hand end for holding the feed screw 18 against rotation. With the solenoid 115 energized, the valve member 106 is held in a position for supplying liquid from the conduit 107 through the conduit 110 to the space 65 between the driven element 52 and the driving element 50. Communication between the conduit 110 and the exhaust conduit 108 is then cut off, but the conduit 111 continues to communicate with the exhaust conduit 109 for venting liquid from the space 68. The liquid acts in the space 65 to force the driven element 52 into engagement with the driving element 50 at its left hand end for effecting a rotation of the shaft 60 and the gear 26. The gear 25 is then driven by the gear 26 and rotates the feed screw 24 in a direction to move the cross slide 12 along the guideways 14 toward the templet.

As soon as the tracer arm engages the templet and is tilted to lift the plate 83 to a point where the contactor is moved out of engagement with the contact 90, the circuit through the solenoids 101 and 115 is broken. The valve member 93 is then moved by the spring 100 to a position for supplying liquid through the conduit 98 and the passage means 45 to the space 41 where it acts to move the driving and driven elements in opposite directions until they engage at their left hand ends and connect the shaft 33 in driven relation with the power shaft 36. The pinion gear 20 is then rotated to drive the feed screw 18 in a direction for moving the carriage 2 to the left along the guideways 3. The valve member 106 is centered by the springs 112 for cutting off the flow of liquid from the conduit 107 and venting the conduits 110, 111 through the conduits 108 and 109. The driven element 52 is then free of the driving elements 50, 61, and the feed screw 24 stops rotating so that the cross-slide 12 moves only to the left with the carriage 2.

If the tracer is moved into engagement with the templet until it is tilted to a point where the contactor 88 is moved into engagement with the contact 89, a circuit is completed from the power conductor 118 through the solenoid 101, the conductor 119, the contactor 88, the contact 89, the conductor 120 and the solenoid 114 to the power conductor 122. The energizing of the solenoid 101 again effects movement of the valve member 93 to a position for supplying liquid through the conduit 97 to the space 39 where it moves the driven element 32 into engagement with the housing for braking the rotation of the feed screw 18. The solenoid 114 moves the valve member 106 to a position for supplying liquid through the conduit 111 and the passage 69 to the space 68 for moving the driven element 52 into engagement with the driving element 61 and effecting a rotation of the feed screw 24 in a direction to move the cross slide 12 away from the templet until the tracer arm moves to a position for breaking the contact between the contactor 88 and the contact 89.

It will be seen that a stepped positioning of the cutting tool 16 will be obtained to shape the workpiece 5 to the contour of the templet. When a circuit is completed through one or the other of the solenoids 114 and 115, it is also completed through the solenoid 101. The feed screw 18 is then held against rotation, and the feed screw 24 is rotated in one direction or the other depending on which of the solenoids 114, 115 is energized. The cutting tool is then moved transversely of the lathe with the cross-slide until the tracer operates to open the circuit. As soon as the circuit is opened, the feed screw 24 is stopped and the feed screw 18 is rotated to move the carriage 2 to the left along the guideways 3. The cross-slide 12 and the tool move with the carriage parallel to the axis of the workpiece 5. The clutch mechanisms 22 and 27 operate almost instantly to change the driving connections for the feed screws 18 and 24. The contacts 89 and 90 may be adjusted so that only a slight movement of the contactor 88 is required to change the connection from one to the other.

In Fig. 6 there is shown a system similar to that of Fig. 3 but having valve mechanisms 125 and 126 actuated by a pressure fluid for controlling the supply of liquid to clutch mechanisms 126a and 127 which control the driving of the longitudinal and transverse feed screws 18 and 24. The valve mechanism 125 includes a valve member 128 having lands 129, 130, 131, 132 and 133 reciprocably received in the bore of a casing 134. A liquid supply conduit 135 communicates with a port 136 at the center of the casing, this port being large enough to pass liquid to the casing at each side of the land 129 when the valve member 128 is centered therein. Exhaust conduits 138 and 139 communicate with the casing between the lands 130, 132 and 131, 133, respectively. Conduits 140 and 141 communicate with the casing past the inner edges of the lands 130, 131 when the valve member is centered, and these conduits are connected by a conduit 142 to the interior of a housing 143 for the clutch 126, as shown.

A piston 145 is fixed to the shaft 33 carrying the pinion gear 20 and is reciprocable in the clutch housing to engage either a member 146 fixed to the housing or a member 147 rotated in the housing by a motor 148. A conduit 150 supplies liquid to the clutch housing at the left hand side of the piston and at a pressure sufficient to move the piston into engagement with the member 146 when the conduit 142 is connected to exhaust. When liquid is supplied from the conduit 135 through the conduit 142 to the clutch housing, the piston is moved to the left into engagement with the rotating member 147.

The valve mechanism 125 includes a valve member 152 having lands 153, 154 and 155 reciprocably received within a casing 156. A liquid supply conduit 158 opens into the casing at a point normally covered by the land 155, and exhaust conduits 159 and 160 open into the casing at points normally communicating with conduits 161 and 162 leading to the clutch mechanism 127 which is like the clutch mechanism shown in Fig. 5.

Connected to the valve members 128 and 152 are bellows 165 and 166 communicating with conduits 167 and 168 to which air is supplied under pressure from a supply conduit 170 past a pressure regulator 171 and an orifice 172. A tracer 175 cooperates with the templet 76 for controlling the venting of air from the conduits 167 and 168 through a conduit 176. As the discharge from the tracer to the atmosphere varies, the pressure in the conduits 167 and 168 is caused to vary. Springs 178 and 179 act between the valve casings 134, 156 and the bellows 165, 166, respectively, for holding the valve members in centered positions when a predetermined pressure exists in the conduits 167 and 168.

The tracer 175 is like that shown in Fig. 3 except that a valve mechanism 180 is connected, as shown in Fig. 7, in place of the contactor 88 and the contacts 89, 90 for controlling the venting of the conduit 176 to atmosphere. The valve mechanism 180 comprises a valve member 182 connected to the yoke 87 of the tracer and slidably received within a valve sleeve 183 for controlling the connection of the conduit 176 to atmosphere through passage means 184, the interior of the valve sleeve, and notches 185 in one end of the valve sleeve.

When the tracer arm is free from the templet, the plate 83 engages the flange 84 over its full periphery, as described above in connection with the mechanism of Fig. 3. The valve member 182 is then positioned in the valve sleeve 183 to restrict the escape of air through the notches 185 and produce a pressure in the conduits 167 and 168 sufficient to expand the bellows 165 and 166 against the action of the springs 178 and 179. The valve member 128 is then positioned so that the land 129 cuts off the flow of liquid past its left hand edge to the conduit 140 and the land 131 cuts off the flow of liquid to the conduit 141. The land 131 is positioned to the left of the conduit 131 so that the latter communicates with the exhaust conduit 139 for exhausting liquid from the right hand side of the piston 145. The liquid supplied to the left hand side of the piston through the conduit 150 then acts to move the piston into engagement with the member 146 for braking the rotation of the feed screw 18. Movement of the valve member 152 by the expansion of the bellows 166 results in a connection of the supply conduit 158 to the conduit 162 for effecting operation of the clutch 127 to drive the feed screw 24 in a direction to move the cross-slide 12 toward the templet. The tracer 175 moves with the cross-slide since it is attached thereto as shown in Fig. 1. As soon as the tracer arm engages the templet and tilts the plate 83, the yoke 87 is raised to move the valve member 182 for increasing the venting of air from the conduit 176.

When the pressure in the conduits 167 and 168 is reduced to a predetermined value, the springs 178 and 179 move the valve members to their centered positions as shown in Fig. 6. Liquid is then supplied past both sides of the land 129 to the conduits 140, 141 and to the right hand side of the piston 145 for moving the latter into engagement with the driving member 147 and effecting rotation of the feed screw 18 to move the carriage 2 to the left. Centering of the valve member 152 results in a venting of liquid from the conduits 161 and 162 so that the clutch 127 disconnects the driving connection for the feed screw 24. The tool is then moved with the carriage 2 longitudinally of the lathe.

If the shape of the templet is such that further tilting of the tracer arm 79 takes place as it is moved with the carriage, the valve member 182 is raised further to vent air more freely from the conduit 176. As the pressure drops in the conduits 167, 168, the valve members 128 and 152 are moved from their centered positions by the springs 178 and 179. A predetermined movement of the valve member 128 to the right results in a cutting off of the liquid supply to the conduits 140, 141, and a connection of the conduit 140 to the exhaust conduit 138. This drains the liquid from the right hand side of the piston 145 and results in a movement of the latter by the liquid supplied from the conduit 150 to engage the piston with the member 146 for braking the rotation of the feed screw 18. Movement of the valve member 152 by the spring 179 results in a connection of the supply conduit 158 to the conduit 161 for effecting actuation of the clutch 127 to drive the feed screw 24 in a direction to move the cross-slide away from the templet. It will be seen that the tool 16 will be moved in steps transversely and longitudinally of the lathe for shaping the work piece 5 in accordance with the contour of the lathe. The surface of the work piece will be slightly rough due to the positioning of the tool in the manner described, but the degree of roughness may be made very small by proportioning the lands of the valve member so that only slight movements are necessary to change the connections to the clutch mechanisms from supply to exhaust. The tracer mechanism may also be proportioned so that slight changes in the tilting of the tracer arm will produce comparatively large changes in the pressure positioning the valve member.

While there are described in this application several forms which my invention may assume in practice, it will be understood that it may be modified and embodied in various other forms without departing from its spirit or the scope of the appended claims.

What I claim as new, and desire to secure by Letters Patent of the United States, is:

1. In a machine tool having a work piece mounted to be operated upon by a cutting tool, a carriage movable in a predetermined path, a cross-slide carrying said cutting tool and supported on said carriage for movement transversely of the path of movement of said carriage, separate feed-screws respectively operatively engaging said carriage and slide, and respective power shafts adapted to drive said feed-screws: automatic tool feed control mechanism comprising in combination respective fluid responsive clutches for connecting and disconnecting said feed-screws and their respective power shafts and adapted to impart movement to said carriage and cross-slide to thereby effect feed movement of said cutting tool; respective fluid valves for controlling the flow of fluid to and from said fluid responsive clutches; and a common mechanism for controlling the operation of said respective valves comprising a stationary template mounted on said machine, a tractor mounted on said cross-slide for universal tilting movement in a normal non-tilted position and being adapted upon contact with said template to be tilted from its normal position, and valve actuating mechanism, including a control member operatively connected to said tracer and movable from one extreme position to another extreme position respectively determined by the non-tilted and full tilted positions of said tracer, to successively move said fluid valves to supply fluid to said respective fluid responsive clutches in a manner to alternately engage and disengage said clutches and their respective feed-screws and drive shafts whereby said cutting tool is moved in repeating cycles toward said workpiece to cutting position, then along said workpiece to partially cut the workpiece to the shape determined by said template, and finally away from said workpiece.

2. The combination defined in claim 1 together with a movable contact element carried by said member of said valve control mechanism; and a pair of opposed contacts one of which normally engages said movable contact and the other of which engages said movable contact when said tracer is fully tilted and said member moves to its opposite extreme position; a normally closed circuit containing said movable contact, a first lead including a normally energized solenoid positioning said carriage feed-screw clutch control valve to supply fluid to disengage said clutch, said one contact, a second lead containing a normally energized solenoid positioning said cross-slide feed-screw clutch control valve to supply fluid to engage said clutch and effect feeding movement of said cross-slide and tracer toward said template and said cutting tool to cutting position with respect to said workpiece; and a normally open circuit containing the other of said contacts, a third lead including a solenoid adapted when energized to move said cross-slide feed-screw clutch control valve to supply fluid to engage said clutch and move said cross-slide tracer in the opposite direction away from said template and said cutting tool away from said workpiece, said normally closed circuit, upon initial tilting of said tracer, being opened to disengage said cross-slide feed clutch and disrupt feed movement of said cross-slide feed-screw and engage said carriage feed-screw clutch and establish feed movement of said carriage feed-screw to establish cutting feed movement to said cutting tool, and said normally open circuit, upon further tilting of said tracer and through said movable contact, being adapted to be connected in series with said first lead to disengage said carriage feed clutch and disrupt cutting feed movement of said carriage feed-screw and engage said cross-slide feed clutch and establish feed movement of said cross-slide feed-screw in the opposite direction to move said tracer away from said template and said cutting tool away from said work piece.

3. The combination defined in claim 2 together with a spring associated with said carriage feed-screw clutch control valve and acting in opposition to said first mentioned solenoid whereby, when said tracer is tilted to disengage said movable contact from both of said opposed contacts, said valve controlling said carriage feed clutch moves to supply fluid to engage said clutch and establish cutting feed movement of said carriage, cross-slide and cutting tool with respect to said workpiece and springs associated with said cross-slide feed-screw clutch control valve acting in opposition to the solenoids of said valve whereby, when said tracer is tilted to disengage said movable contact from said opposed contacts said valve controlling said cross-slide feed clutch moves to supply fluid to disengage said clutch and disrupt feed movement of said cross-slide and cutting tool toward and away from said workpiece.

4. The combination defined in claim 1 together with a master fluid control valve carried by said member of said valve control mechanism and adapted to provide controlled passage of fluid to the atmosphere; a fluid pressure line connecting said master control valve to a source of fluid under pressure and having a pair of branch connections; a pressure responsive valve actuator connected to one of said branch connections and adapted to operate the carriage feed screw clutch control valve; a second pressure responsive valve actuator connected to the other of said branch connections and adapted to operate the cross-slide feed screw clutch control valve, said master fluid control valve in the non-tilted position of said tracer effects maximum restriction to passage of fluid to the atmosphere whereby said pressure line and valve actuators are subjected to a maximum positive pressure and said actuators respectively position said carriage feed-screw clutch control valve to supply fluid to disengage said carriage feed-screw clutch and position said cross-slide feed-screw clutch control valve to supply fluid to engage said cross-slide feed-screw clutch thereby effecting feed movement of said cross-slide, tracer, and cutting tool toward said template and workpiece.

5. The combination defined in claim 4 wherein said master fluid control valve in the initial tilted position of said tracer is moved to increase the flow of fluid to the atmosphere whereby said pressure line and valve actuators are subjected to a lesser positive pressure and said actuators respectively position said carriage feed-screw clutch control valve to supply fluid to engage said carriage feed-screw clutch thereby effecting feeding movement of said carriage, cross-slide, tracer, and cutting tool along said template and workpiece for cutting said workpiece to a form determined by said template and position said cross-slide feed-screw clutch control valve to supply fluid to disengage said cross-slide feed-screw clutch thereby interrupting said feeding movement toward said template and workpiece.

6. The combination defined in claim 5 wherein said master fluid control valve upon further tilting of said tracer is moved to further increase the flow of fluid to the atmosphere whereby said pressure line and valve actuators are subjected to a minimum positive pressure and said actuators respectively position said carriage feed-screw clutch control valve to again supply fluid to disengage said carriage feed-screw clutch thereby interrupting said feeding movement along said template and workpiece and position said cross-slide feed-screw clutch control valve to supply fluid to engage said cross-slide feed-screw clutch to effect movement of said cross-slide, tracer, and cutting tool in a retractile direction away from said template and workpiece.

7. Control mechanism for automatically effecting relative movement between a work performing member and a member on which work is to be performed comprising: a pair of separate rotary drive means for said work performing member, one of which is adapted to effect relative movement between said members in a first plane, and the other of which is adapted to effect relative closing and opening movement in a second plane; fluid responsive clutch members for each of said drive means; respective fluid valves for controlling the flow of fluid to and from said fluid responsive clutches; and a common mechanism for controlling the operation of said respective valves comprising a stationary control template, a tracer supported for bodily movement with said work performing member and being mounted for universal tilting movement from its normal non-tilted position upon contact with said template, and valve actuating mechanism, including a control member operatively connected to said tracer and movable from one extreme position to another extreme position, respectively, determined by the non-tilted and full-tilted positions of said tracer to successively move said fluid valves to selectively actuate said clutch mechanisms to effect relative movement of said members in one or the other of said planes.

8. Control mechanism for automatically effecting relative movement between a work performing member and a workpiece comprising: a pair of separate rotary drive means for said work performing member, one of which is adapted to effect relative movement between said members in a plane parallel to the axis of said workpiece, and the other of which is adapted to effect relative closing and opening movement between said members in a plane transverse to the axis of said workpiece; fluid responsive clutch members for each of said drive means; respective fluid valves for controlling the flow of fluid to and from said fluid responsive clutches; and a common mechanism controlling the operation of said respective valves comprising a control template and a tracer supported for relative movement, said tracer being movable with respect to said supporting means to and away from a normal position upon contact with said template, and valve actuating mechanism including a control member operatively connected to said tracer and movable to and away from a normal position in response to similar movement of said tracer, said control member being operative to move one of said fluid valves to actuate said one of said drive means when said control member occupies its normal position and being operative to move another of said valves to actuate said other of said drive means when said control member is displaced a predetermined amount from said normal position.

CLARENCE JOHNSON.

REFERENCES CITED

The following references are of record in the file of this patent:

UNITED STATES PATENTS

| Number | Name | Date |
|---|---|---|
| 1,772,431 | Shaw | Aug. 5, 1930 |
| 1,948,617 | Hoagland | Feb. 27, 1934 |
| 2,202,766 | Trosch | May 28, 1940 |
| 2,335,305 | Parsons | Nov. 30, 1943 |
| 2,415,801 | Armitage | Feb. 11, 1947 |
| 2,436,373 | Barnes | Feb. 24, 1948 |